United States Patent [19]

Ishikawa et al.

[11] Patent Number: 5,750,941
[45] Date of Patent: May 12, 1998

[54] ULTRASONIC COORDINATES INPUT DEVICE

[75] Inventors: Hiroshi Ishikawa; Nobuyasu Yamaguchi; Yasuhide Iwamoto; Atsuo Iida, all of Kawasaki, Japan

[73] Assignee: Fujitsu Limited, Kawasaki, Japan

[21] Appl. No.: 520,669

[22] Filed: Aug. 29, 1995

[30] Foreign Application Priority Data

Dec. 15, 1994 [JP] Japan .................................. 6-312100

[51] Int. Cl.[6] .................................................. G08C 21/00
[52] U.S. Cl. .................................... 178/19; 345/177
[58] Field of Search ................................ 178/18, 19, 20; 345/173, 174, 177, 175; 367/118, 124, 907, 902

[56] References Cited

U.S. PATENT DOCUMENTS

| | | | |
|---|---|---|---|
| 4,758,691 | 7/1988 | De Brunye | 178/19 |
| 4,814,552 | 3/1989 | Stefik et al. | 178/18 |
| 4,991,148 | 2/1991 | Gilchrist | 367/907 |
| 5,402,151 | 3/1995 | Duwaer | 345/177 |
| 5,561,447 | 10/1996 | Suzuki et al. | 345/179 |
| 5,565,893 | 10/1996 | Sato et al. | 345/177 |
| 5,573,077 | 11/1996 | Knowles | 178/19 |

FOREIGN PATENT DOCUMENTS 63-14220  1/1988  Japan .

*Primary Examiner*—Curtis Kuntz
*Assistant Examiner*—Paul Loomis
*Attorney, Agent, or Firm*—Armstrong, Westerman, Hattori, McLeland & Naughton

[57] ABSTRACT

The ultrasonic coordinates input device includes receivers grouped into a plurality of groups, each receiver receiving the ultrasonic waves propagated through a propagator so as to calculate the coordinates of the ultrasonic wave inputted positions on the basis of signals received by each group, thereby ensuring that the coordinates are calculated with a simple mathematical formulae with a negligible error if any.

25 Claims, 24 Drawing Sheets

●────── : LOCUS OF INPUT PEN ON PROPAGATOR 2
●------ : LOCUS DISPLAYED ON DISPLAY 6

ULTRASONIC COORDINATES INPUT DEVICE

BACKGROUND OF THE INVENTION

1. Field of the Invention

The present invention relates generally to an ultrasonic coordinates input device, and more particularly to an input device such as a pen which specifies the coordinates inputted through the propagation of ultrasonic wave oscillated by the input device.

2. Description of Related Art

In line with the development of computer technologies man-to-machine interfaces such as input pens call people's attention and have come into wide use in inputting characters and drawings handwritten by a pen or any other writing instrument. The input pen device includes a display and a coordinates detector. The operator inputs characters and drawings on the display panel by a pen, and identifies the coordinates of them through the coordinates detector. On the basis of the detected results various information is indicated on the display panel.

At present, there are at least three systems known in the art; that is, an electromagnetic induction system, a resistance film system, and an ultrasonic wave system. The electromagnetic induction system uses as a receiver an opaque panel having a special receiving coil arranged to detect coordinates, wherein the opaque panel is placed behind the display. The resistance film system uses as a coordinates detector a resistance film glass panel wholly covered with a special transparent conductive film, wherein because of the film the permeability is sacrificed. This blurs the display, and leads to the waste of electricity.

For the reasons mentioned above, there is used an ultrasonic input pen device incorporating an ultrasonic wave generator which propagates ultrasonic wave from the pen tip through an ultrasonic propagator (hereinafter "propagator") having a plurality of piezoelectric oscillators formed thereon so as to detect the ultrasonic wave and specify the coordinates.

Referring to FIGS. 1 to 3, the known ultrasonic coordinates input device will be rare particularly described:

FIG. 1 is a diagram showing the basic configuration of the ultrasonic coordinates input device. FIG. 2 shows an orthogonal coordinates system to explain the principle of detecting coordinates in the ultrasonic coordinates input device. FIG. 3 is a chart showing signals received. In FIG. 1, 41 is an ultrasonic input pen incorporating a piezoelectric oscillator for oscillating ultrasonic wave. There is provided an ultrasonic input pen 41 connected through a cord 51 to a driving circuit 52 for driving the piezoelectric oscillator. The input pen 41 is provided with a tip portion with which it touches the propagator 42. The propagator 42 has a plurality of piezoelectric oscillators 43 (the illustrated example has two oscillators) as a receiving element (hereinafter "receiver") bonded to the periphery thereof with a conductive adhesive. The ultrasonic wave oscillated by the pen 41 is propagated through the propagator 42, and received by each of the receivers 43. A detector circuit 44 including a pre-amplifier etc. detects the ultrasonic wave received by each of the receivers 43, and outputs detection signals to an arithmetic circuit 45. In addition, a period of time for which the ultrasonic wave is oscillated by the input pen 41 is input as a time data to the arithmetic circuit 45 through the cord 51. The arithmetic circuit 45 arithmetically processes the detection signals from the detector circuit 44 and the time data oscillated from the input pen 41 so as to specify the coordinates. The specified coordinates are displayed on the display panel 46.

The theory underlying the detection of the coordinates will be described by referring FIGS. 2 and 3:

As shown in FIGS. 2 and 3, it is possible to obtain the coordinates by measuring a time for which the ultrasonic waves outputted by the input pen 41 are propagated through the propagator 42 and received by the receivers 43. Now, suppose that the position inputted by the input pen 41 is P (x, y), and the positions of two receivers 43, 43 are respectively $\alpha(0, 0)$ and $\beta(L, 0)$, and the velocity at which the ultrasonic wave propagates through the propagator 42 is C, the time for which the ultrasonic waves propages from P to $\alpha$ and from P to $\beta$ is respectively $t_1$ and $t_2$. The coordinates of the position P are specified as follows, wherein L and C are known values, and $t_1$ and $t_2$ are measured values:

$$(C \cdot t_1)^2 = x^2 + y^2 \qquad (1)$$

$$(C \cdot t_2)^2 = (L-x)^2 + y^2 \qquad (2)$$

from (2)−(1)

$$x = \{C^2(t_1^2 - t_2^2) + L\} \div 2L \qquad (3)$$

from (1) and (3)

$$y = [C^2 \cdot t_1^2 - \{L^2 + C^2(t_1^2 - t_2^2)\}^2 \div 4L^2]^{1/2} \qquad (4)$$

In order to enhance the accuracy of the calculation of coordinates, Japanese Application Laid-Open No. 63-14220 (1988) discloses a method of providing receivers at the four corners of a rectangular propagator, and calculating the coordinates of the ultrasonic wave input position on the basis of the signals received by the three receivers earlier than the fourth receiver.

Under the system described above it is possible to calculate the coordinates of the ultrasonic wave input positions by use of such simple equations as equations (3) and (4). However, this system calculates the coordinates through the measurement of a period of propagation, that is, a period of time from the generation of the ultrasonic wave signals by the input pen 41 to the reception of them at the receivers 43 after being propagated through the propagator 42. In order to measure the period of propagation, any reference time is required; in the illustrated example a time at which the ultrasonic wave is oscillated by the input pen 41 is inputted to the arithmetic circuit 45 as a reference time, but it disadvantageously requires that the input pen 41 is connected to the body of the input device by means of a cord 51. The cord 51 is likely to be an obstacle to the manoeuvring of the input pen 41 and the operator suffers from an unnecessary burden.

In order to solve the problem involved in using a cord, the Inventor has proposed the method of calculating the coordinates of the ultrasonic wave inputted position. Referring to FIG. 4, this method will be described:

In FIG. 4, the propagator 42 has a size of H×W (H<W), wherein the H is the vertical side and the W is the horizontal side, with the origin (0, 0) in the center. The propagator 42 is provided with receivers 43a, 43b, 43c, and 43d at the respective corners. The coordinates of the receivers 43a, 43b, 43c and 43d are (W/2, H/2), (W/2, −H/2), (−W/2, H/2), and (−W/2, −H/2). A case where the pen 41 designates the position P (x, y) in the propagator 42, and the signals from the three receivers 43a, 43b, and 43c are used to calculate the coordinates of the input position will be described by referring to FIG. 5:

FIG. 5 shows signals oscillated by the input pen 41 and signals received by the receivers 43a, 43b and 43c. The signals are received in the timing order of the receiver 43a, 43b and 43c, thereby producing time differences $T_{ab}$ and $T_{ac}$ between the receivers 43a and 43b, and between the receivers 43a and 43c, respectively. These time differences are measured.

Suppose that the distances from the position P to the respective receivers 43a, 43b and 43c are ra, rb, and rc. In general, when points are distant from two points in the coordinate are plotted but the differences in the distances are the same, they are plotted in a hyperbola having foci of the two points. If the difference $d_{ab}$ in the distances between the point P and the receiver 43a, and between the point P and the receiver 43b, and the difference $d_{ac}$ in the distances between the point P and the receiver 43a, and between the point P and the receiver 43c are measured, the coordinates of the point P can be obtained as the intersection of the hyperbola A having the foci of the positions of the receivers 43a and 43b and the hyperbola B having the foci of the positions of the receivers 43a and 43c. Suppose that the acoustic velocity of the differences $d_{ab}$ and $d_{ac}$ are C, the coordinates (x, y) of the point P can be obtained using time differences $T_{ab}$ and $T_{ac}$:

$$d_{ab} = rb - ra = C \cdot T_{ab}$$

$$d_{ac} = rc - ra = C \cdot T_{ac} \tag{5}$$

ra, rb, rc are expressed by equations (6)

$$ra^2 = (W/2 - x)^2 + (H/2 - y)^2$$

$$rb^2 = (W/2 - x)^2 + (H/2 + y)^2 \tag{6}$$

$$rc^2 = (W/2 + x)^2 + (H/2 - y)^2$$

Then, $$\begin{aligned} rc^2 - ra^2 &= (rc - ra)(rc + ra) \\ &= (W/2 + x)^2 - (W/2 - x)^2 = 2W \cdot x \\ rb^2 - ra^2 &= (rb - ra)(rb + ra) \\ &= (H/2 + y)^2 - (H/2 - y)^2 = 2H \cdot y \end{aligned} \tag{7}$$

from the equations (5) and (7)

$$2ra = (2H \cdot y - d_{ab}^2)/d_{ab} = (2W \cdot x - d_{ac}^2)/d_{ac} \tag{8}$$

from the equation (8)

$$y = \{(W \cdot d_{ab})/(W \cdot d_{ac})\}x + (d_{ab}/2H)(d_{ab} - d_{ac}) \tag{9}$$

Finally, the equations (8) and (9) are put into the equation (5), and as a result:

$$(W^2 \cdot H^2 - W^2 \cdot d_{ab}^2 - H^2 \cdot d_{ac}^2)x^2 + \tag{10}$$

$$W \cdot d_{ab} \cdot d_{ac}(H^2 + d_{ab} \cdot d_{bc})x - d_{ac}^2\{H^2 \cdot (W^2 - d_{ac}^2) +$$

$$(H^2 + d_{ab} \cdot d_{bc})^2\}/4 = 0$$

where $d_{bc} = d_{ac} - d_{ab}$

This quadratic equation is solved as follows:

$$x = \{(d_{ac}^2)/2\} \times [\{H^2(W^2 - d_{ac}^2) + (H^2 + d_{ab} \cdot d_{bc})^2\}/\Gamma] \tag{11}$$

where $$\Gamma = W \cdot d_{ab}(H^2 + d_{ab} \cdot d_{bc}) + \{W^2 \cdot d_{ab}^2(H^2 + d_{ab} \cdot d_{bc})^2 + \Delta\}^{1/2}$$

$$\Delta = (W^2 \cdot H^2 - W^2 \cdot d_{ab}^2 - H^2 \cdot d_{ac}^2) \cdot \{H^2 \cdot (W^2 - d_{ac}^2) + (H^2 + d_{ab} \cdot d_{bc})^2\}$$

On the basis of the equations (9) and (11) the coordinates of the position of the point P (x, y) is obtained. According to this method, a time difference $T_{ab}$ and $T_{ac}$ involved in receiving signals can be used to calculate the coordinates. Advantageously, these time differences can be measured irrespective of any timing for oscillating signals by the input pen 41, thereby eliminating the necessity of using time data about the oscillation of signals by the input pen 41. As a result, no cord is required, thereby providing a cordless input pen 41.

The method is capable of providing a cordless input pen but the coordinates (x, y) must be obtained by such complicated equations as the equations (9) and (11), thereby overloading the arithmetic circuit and increasing the cost.

Another problem involved in using an input pen is that the pen is normally declined against the propagator when the pen comes into touch with it. When the receivers are arranged at the four corners of the propagator, the angles among the input pen, the propagator and the receivers largely vary with the receivers, thereby causing the phases of the ultrasonic waveforms of the signals received by the receivers to differ from each other. This is likely to cause an error in calculating the coordinates.

SUMMARY OF THE INVENTION

The present invention is directed to solve the problems discussed above, and it is an object of the present invention to provide an ultrasonic coordinates input device which obtains coordinates of the ultrasonic wave input positions with the use of relatively simple equations, and reduces an error involved in the phase differences of the ultrasonic waveforms among the receivers. Other object of the present invention is to provide an ultrasonic coordinates input device excellent in operability because of the cordless input pen.

In a preferred embodiment of the present invention, the ultrasonic coordinates input device includes a propagator for allowing ultrasonic wave to propagate therethrough, an input means for inputting ultrasonic waves to the propagator, a plurality of groups of receivers each receiving the ultrasonic waves propagated through the propagator, and an arithmetic means for calculating the coordinates of the ultrasonic wave inputted positions on the propagator on the basis of the signals received at the receivers in the respective groups.

Since the coordinates of the ultrasonic wave inputted positions are obtained by each group of receivers, the angular differences among the input device, the propagator and the receivers can be minimized, thereby preventing the received ultrasonic waveforms from having large phase differences. This enhances the accuracy of calculation.

Preferably, the plurality of receivers in each group are substantially aligned, thereby minimizing the angular differences among the input device, the propagator and the receivers.

Preferably, the arithmetic means calculates a part of the coordinates of the ultrasonic wave inputted positions to be calculated on the basis of the signals received at the receivers in the respective groups, thereby simplifying the equation used to calculate the coordinates of the ultrasonic wave inputted position.

Preferably, the receivers are grouped into two groups, and the arithmetic means calculates the coordinates on one axis of the orthogonal coordinates axes on the basis of signals received by the receivers in one group, and calculates the coordinates on the other axis on the basis of signals received by the receivers in the other group, thereby obtaining the coordinates x and y of the ultrasonic wave inputted position by the simple equation.

As a result, each receiver receives a rise of the first wave of the planar symmetrical wave which is fastest of the ultrasonic waves propagating through the propagator, thereby avoiding receiving planar non-symmetrical waves received later than the planar symmetrical wave and unfavorable influences occurring at the end portions of the propagator. This eliminates the necessity of providing an extra ultrasonic wave absorber along the periphery of the propagator.

Preferably, in addition to the fact that each of the receivers receives a planar symmetrical wave which is fastest of the ultrasonic waves propagating through the propagator, it is provided with a detecting means for effecting the full-wave rectification of the planar symmetrical waves so as to detect a rise of the first wave or an envelop component thereof, wherein the arithmetic means measures time differences in receiving the ultrasonic waves between the receivers in accordance with the results of detection obtained by each of the receivers. Accordingly, even if it is not known whether the first wave of the ultrasonic waves received starts with the rise or the fall, an error in measuring is negligible if any.

Preferably, an identifying means is provided to identify a shift of the ultrasonic wave input means in response to the reception of ultrasonic waves within a predetermined period of time, wherein the predetermined period of time is not shorter than or an integral multiplication of the greatest of all the time differences between the receivers, thereby detecting the touch or non-touch of the input means such as an input pen on the propagator.

The identifying means ignores a predetermined number of signals received immediately after the receivers start to receive and identifies the shift of the input means on the basis of the signals subsequently received, and/or the arithmetic means ignores a predetermined number of signals received immediately after the receivers start to receive and calculates the coordinates of the ultrasonic wave inputted position on the basis of the signals subsequently received, thereby preventing an erroneous detection due to the reception of a possible first unstable ultrasonic signal.

Preferably, an amplifier is additionally provided to amplify signals received by each of the receivers, and an adjusting means is also provided to adjust the amplification factor of the amplifier in accordance with the amplitudes of the signals received by each receiver, thereby adjusting differences of signal levels occurring owing to variations in the writing pressure by the input means (the input pen) on the propagator.

In addition to the amplifier, an adjusting means is provided to adjust the amplification factor of the amplifier in accordance with the distances between the respective receivers and the ultrasonic wave inputted positions calculated on the basis of the coordinates already obtained, thereby adjusting differences of signal levels occurring owing to irregularities in the touching of the input means (the input pen) on the propagator. This secures an accurate calculation of the coordinates.

The input means such as an input pen is preferably provided with an oscillator for oscillating ultrasonic waves, thereby enabling the input means to be cordless. The cordless input means is excellent in manoevring on the propagator.

The above and further objects and features of the invention will more fully be apparent from the following detailed description with accompanying drawings.

DETAILED DESCRIPTION OF THE PREFERRED EMBODIMENTS

Figure 1:
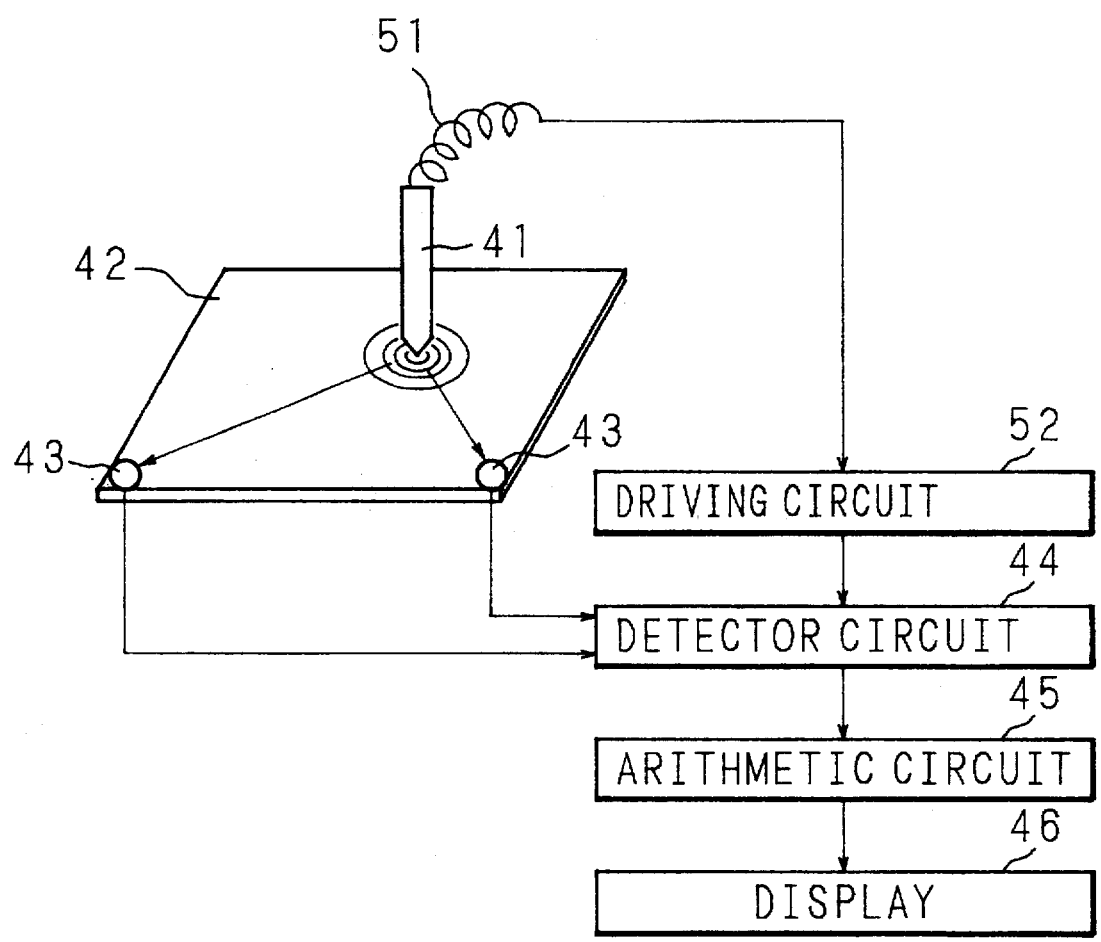
FIG. 1 is a diagrammatic view showing the structure of a known ultrasonic coordinates input device.
Figure 2:
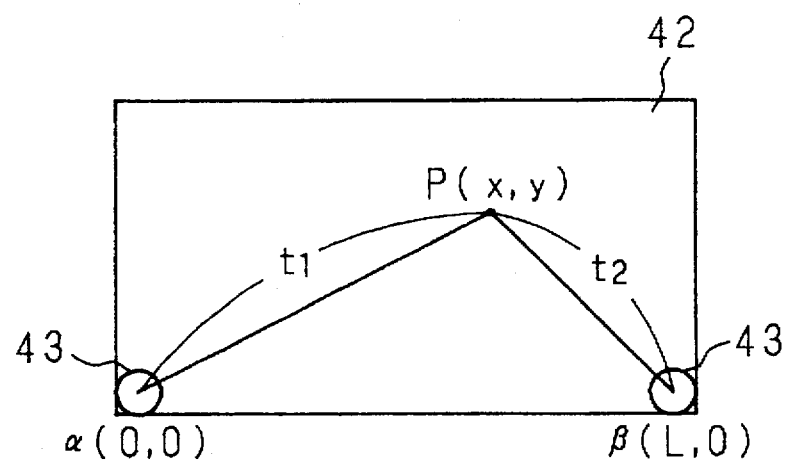
FIG. 2 is a view showing the orthogonal coordinates in a propagator used in the known input device.
Figure 3:
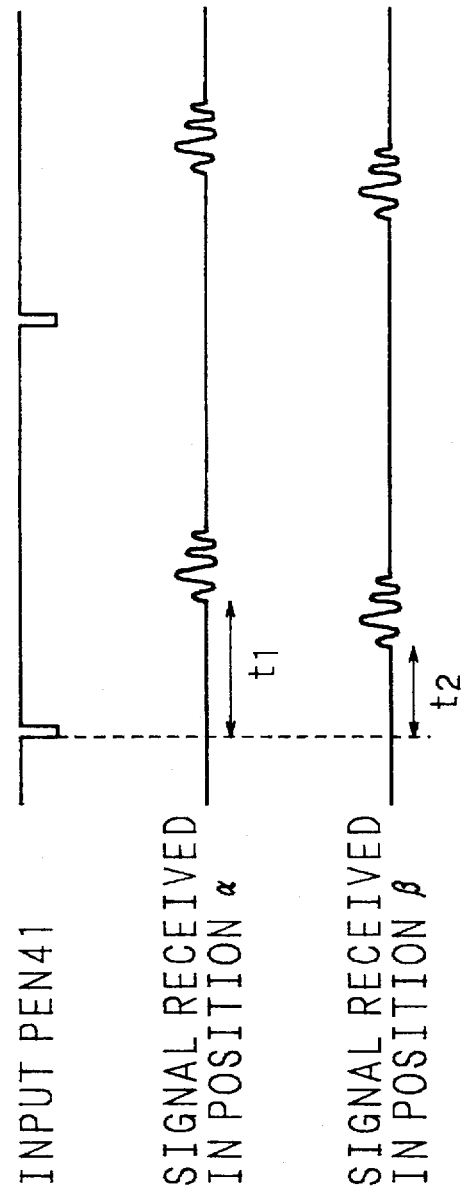
FIG. 3 is a view showing the state of signals oscillated by the input pen and the signals received by the receivers under the known input device.
Figure 4:
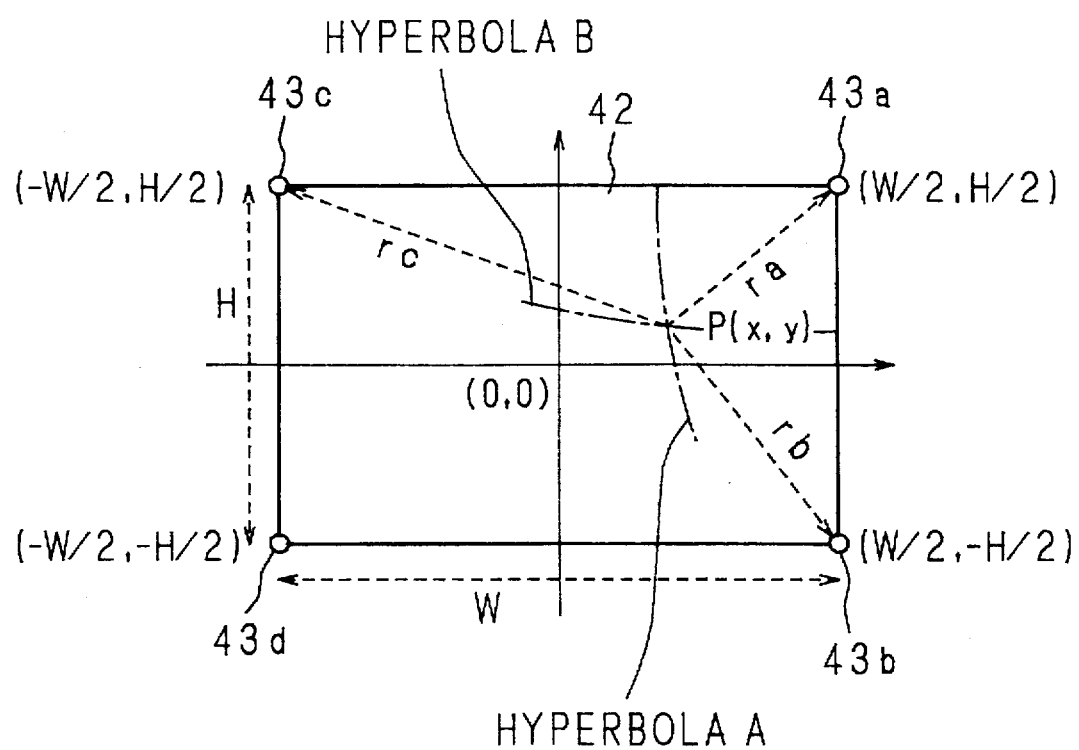
FIG. 4 is the orthogonal coordinates in another known example of the propagator.
Figure 5:
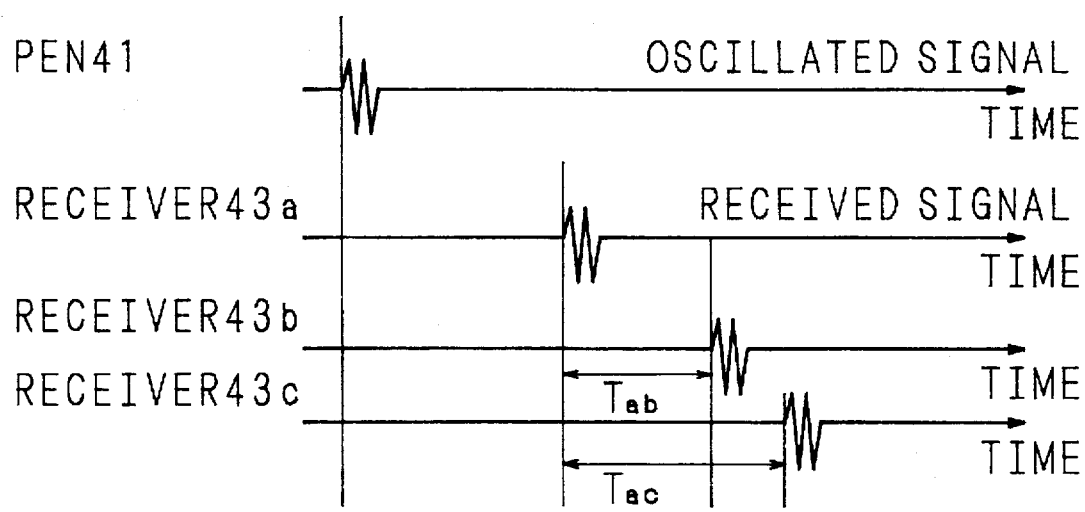
FIG. 5 is a view showing the state of signals oscillated by the input pen and the signals received by the receivers under another example of the known input device.
Figure 6:
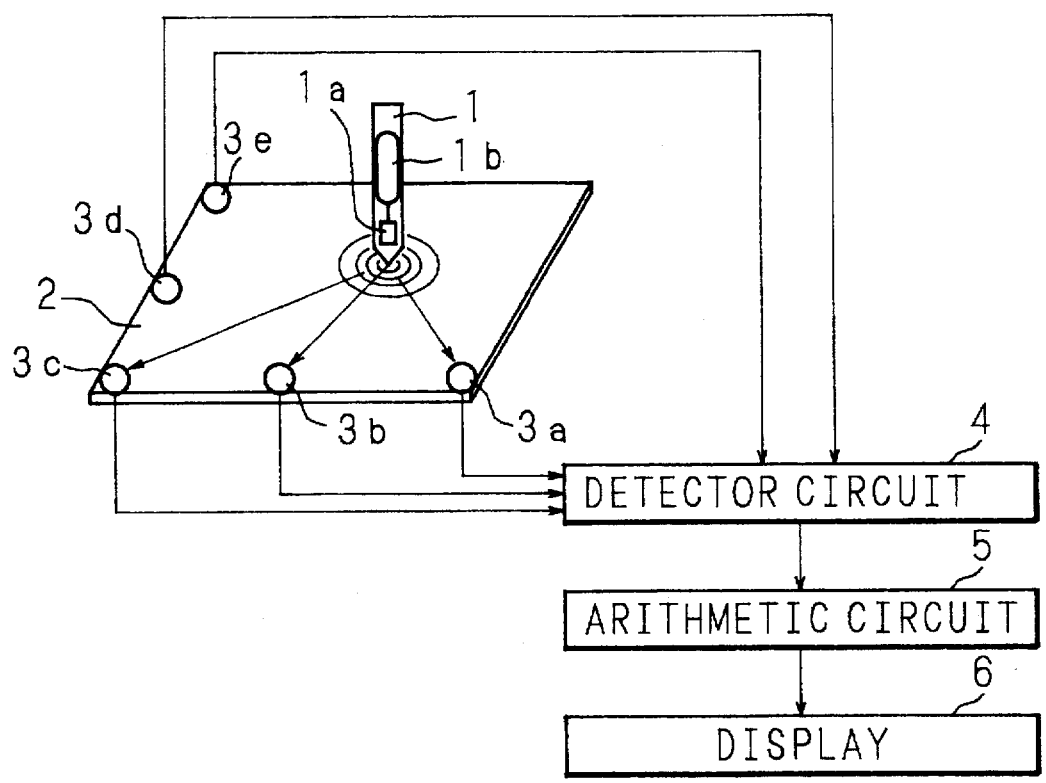
FIG. 6 is a diagrammatic view showing the structure of an ultrasonic coordinates input device according to the present invention.

The present invention will be described by way of examples which are illustrated in FIGS. 6 to 24:

Referring to FIG. 6, the exemplary input device includes an ultrasonic input pen 1 (hereinafter "input pen") which includes a piezoelectric oscillator 1a for oscillating ultrasonic wave and a driver circuit 1b for driving the oscillator 1a. There is provided a rectangular propagator 2 made of a substance such as glass and acrylic allowing ultrasonic wave to propagate therethrough. When the input pen 1 touches the propagator 2, ultrasonic wave oscillated by the input pen propagates through the propagator 2.

The propagator 2 is provided with ultrasonic wave receivers 3a, 3b and 3c along one of the long sides and receivers 3c, 3d and 3e among which the receiver 3c is shared with those of the long side. The receivers 3a to 3e are provided at equal intervals in a line along the respective sides so as to receive ultrasonic wave propagated through the propagator 2. These receivers 3a to 3e can be bonded to the propagator 2 with conductive adhesive or fixed thereto with the use of suitable crimping jigs. The detector circuit 4 including a pre-amplifier, etc. detects the ultrasonic wave received by the receivers 3a to 3e, and outputs the detection signals to the arithmetic circuit 5. The arithmetic circuit 5 performs an arithmetic operation on the basis of the detection signals from the detector circuit 4, and specifies the coordinates. The specified coordinates are displayed on a display 6.

Figure 7:
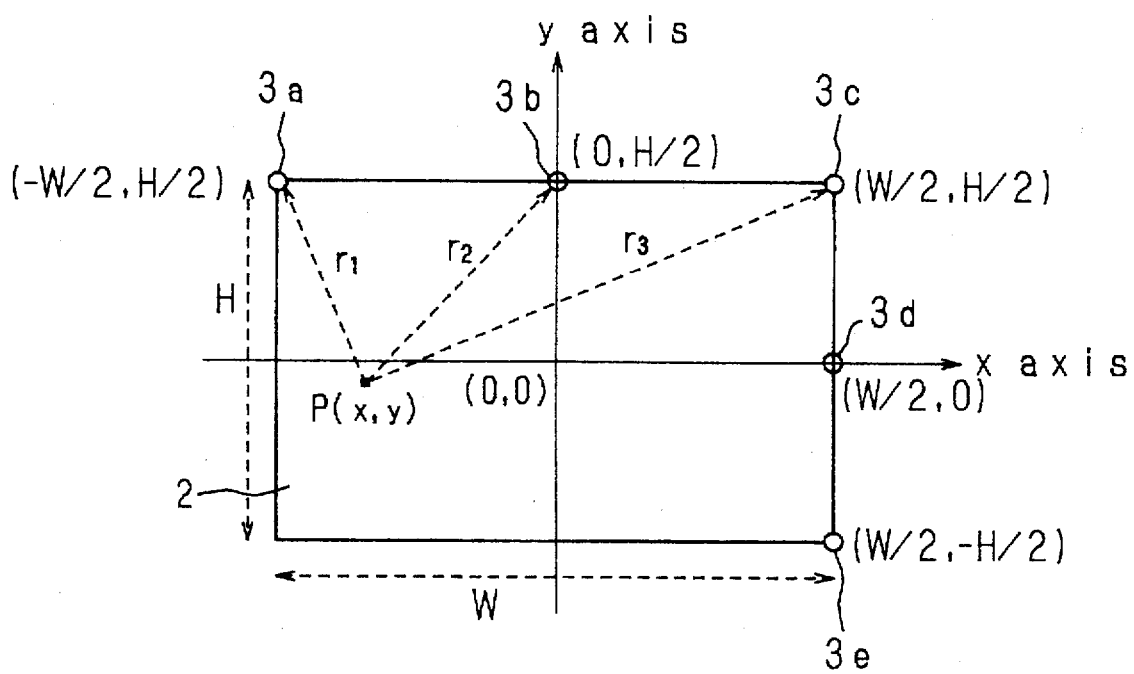
FIG. 7 is the orthogonal coordinates in the propagator in the present invention.
Figure 8:
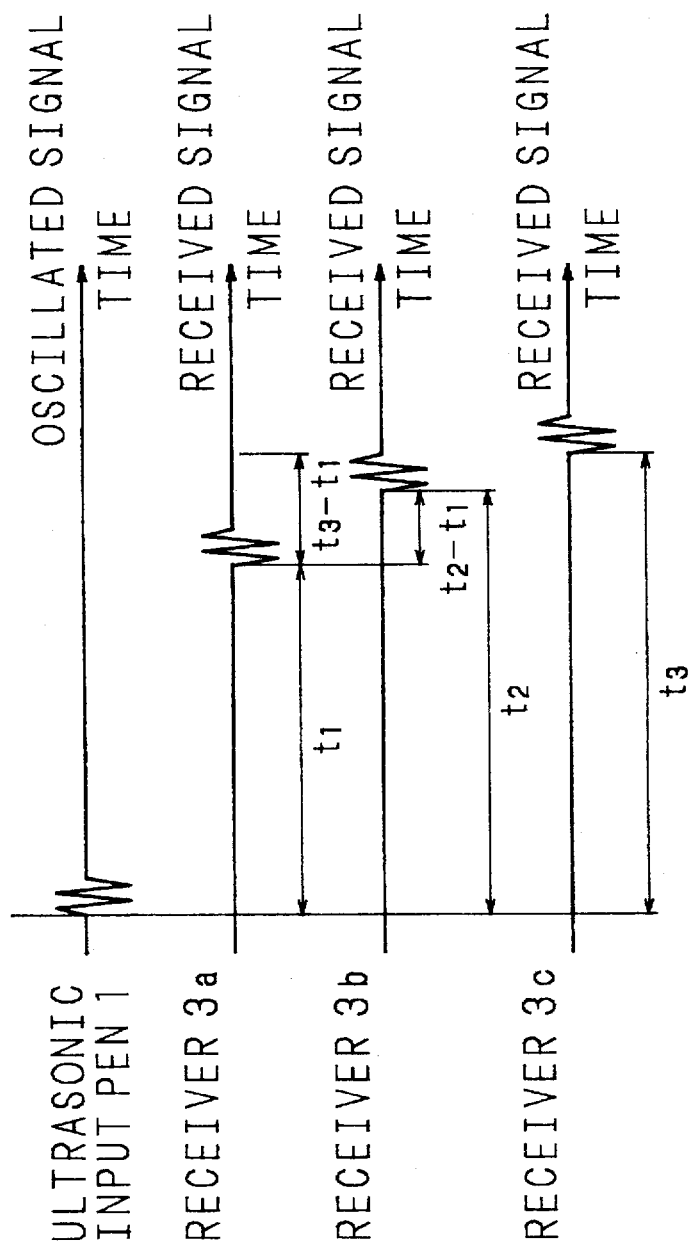
FIG. 8 is a view showing the state of signals oscillated by the input pen and the signals received by the receivers under the present invention.

Referring to FIGS. 7 and 8, the arithmetic principle of the coordinates underlying the present invention will be described:

FIG. 7 indicates an orthogonal coordinates system on the ultrasonic propagator 2, and FIG. 8 indicates a signal oscillated by the input pen 1, and signals received by the receivers 3a, 3b and 3c.

As shown in FIG. 7, the center of the propagator 2 of (H×W) (H<W) is the origin (0, 0), the receivers 3a, 3b and 3c are lying on a straight line at y=H/2, and the receivers 3c, 3d and 3e are lying on a straight line at x=W/2. The x- and y-coordinates of the receivers 3a to 3e are respectively (−W/2, H/2), (0, H/2), (W/2, H/2), (W/2, 0), and (W/2, −H/2). The receivers 3a, 3b and 3c constitute a first receiver group, and the other receivers 3c, 3d and 3e constitute a second receiver group. A point P (x, y) on the propagator 2 is an input point indicated by the input pen 1.

The x-coordinates of an ultrasonic input point is calculated from the results of the receivers 3a, 3b and 3c lying on the line of y=H/2, and the y-coordinates thereof is calculated from the results of the other group of the receivers 3c, 3d and 3e lying on the line of x=W/2. More particularly, the x-coordinates are calculated as follows:

Suppose that the distances between the point (X, Y) and each of the receivers 3a, 3b and 3c are respectively $r_1$, $r_2$ and $r_3$. The following equation is established:

$$r_1^2=(x+W/2)^2+(y-H/2)^2 \tag{12}$$

$$r_2^2=X^2+(y-H/2)^2 \tag{13}$$

$$r_3^2=(X-W/2)^2+(y-H/2)^2 \tag{14}$$

The equations (12)–(13) and (14)–(13) become the following equations:

$$r_1^2-r_2^2=(r_1-r_2)(r_1+r_2)=x \cdot W+W^2/4 \tag{15}$$

$$r_3^2-r_2^2=(r_3-r_2)(r_3+r_2)=-x \cdot W+W^2/4 \tag{16}$$

Herein, when $r_{21}$ is equal to $r_1-r_2$, and $r_{23}$ is equal to $r_3-r_2$, the equations (15) and (16) become the following equations:

$$r_1^2-r_2^2=r_{21}(r_{21}+2r_2)=x \cdot W+W^2/4 \tag{17}$$

$$r_3^2-r_2^2=r_{23}(r_{23}+2r_2)=-x \cdot W+W^2/4 \tag{18}$$

Accordingly, $$2r_2=(x \cdot W+W^2/4)/r_{21}-r_{21}=(-x \cdot W+W^2/4)/r_{23}-r_{23}$$

Accordingly, the x-coordinates are obtained by the following equation (19):

$$x=(r_{21} \cdot r_{23}/W+W/4)(r_{21}-r_{23})/(r_{21}+r_{23}) \tag{19}$$

The y-coordinates are calculated as follows:

Suppose that the distances between the point (X, Y) and each of the receivers 3c, 3d and 3e are respectively $r_3$, $r_4$ and $r_5$. The following equation is established:

$$r_3^2=(x-W/2)^2+(y-H/2)^2 \tag{20}$$

$$r_4^2=(x-W/2)^2+y^2 \tag{21}$$

$$r_5^2=(X-W/2)^2+(y+H/2)^2 \tag{22}$$

The equations (20)–(21) and (22)–(21) become the following equations:

$$r_3^2-r_4^2=(r_3-r_4)(r_3+r_4)=-y \cdot H+H^2/4 \tag{23}$$

$$r_5^2-r_4^2=(r_5-r_4)(r_5+r_4)=y \cdot H+H^2/4 \tag{24}$$

Herein, when $r_{43}$ is equal to $r_3-r_4$, and $r_{45}$ is equal to $r_5-r_4$, the equations (23) and (24) become the following equations:

$$r_3^2-r_4^2=r_{43}(r_{43}+2r_4)=-y \cdot H+H^2/4 \tag{25}$$

$$r_5^2-r_4^2=r_{45}(r_{45}+2r_4)=y \cdot H+H^2/4 \tag{26}$$

Accordingly, $$2r_4=(-y \cdot H+H^2/4)/r_{43}-r_{43}=(y \cdot H+H^2/4)/r_{45}-r_{45}$$

Accordingly, the y-coordinates are obtained by the following equation (27):

$$y=(r_{43} \cdot r_{45}/H+H/4)=(r_{45}-r_{43})/(r_{43}+r_{45}) \tag{27}$$

As an advantage of the present invention, even if the input pen 1 is declined with respect to the propagator 2, the angles among the input pen 1, the propagator 2 and each of the receivers 3a to 3e make no extreme difference like an acute angle or an obtuse angle depending upon the receivers 3a to 3e. This is because the receivers 3a to 3c in the same group lie on the line of y=H/2, and the receivers 3c to 3e in the other group lie on the line of x=W/2, and the signals of the receivers in the same group are substantially the same in phase, thereby reducing an error in calculation.

In the present invention, while one of the x- or y-coordinates is calculated, the other coordinates is canceled. As a result, the equations become simple as shown by the equations (19) and (27) unlike the equations (9) and (11) which are complicated. The equations (19) and (27) are only illustrative, and by using the results of reception at the plural receivers lying on a straight line, a portion containing the other coordinates can be canceled. So long as this requirement is satisfied, the ultimate equations are not limited to the equations (19) and (27) to determine the x- and y-coordinates. For example, in FIG. 7 it is also possible to obtain the y-coordinates of an ultrasonic input point by placing ultrasonic wave receivers at points (−W/2, H/2), (−W/4, H/2) and (0, H/2).

The present invention also allows the x- and y-coordinates to be calculated from a time difference in receiving ultrasonic wave at the receivers, wherein the time difference is equal to (interval÷acoustic velocity at which the ultrasonic wave propagates through the propagator 2). This method is advantageous in that any coordinates can be calculated by using a time difference occurring in ultrasonic wave oscillation irrespective of the timing for oscillating the ultrasonic wave by the input pen 1. This method eliminates the necessity of obtaining data about an oscillation time of the input pen 1, thereby making it possible to make the input pen cordless.

Figure 9:
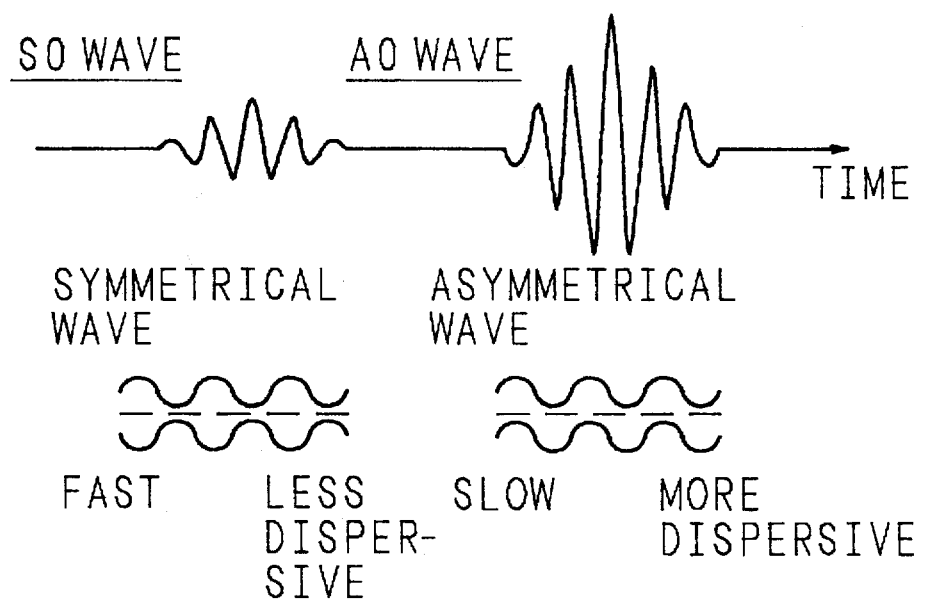
FIG. 9 is a view showing the waveforms of two kinds.

The rising time of a signal received at the receivers 3a to 3e is detected as follows:

Referring to FIG. 9, an ultrasonic wave propagated through the propagator 2 includes a planar symmetrical wave (S0 wave) and a planar non-symmetrical wave (A0 wave) differing in characteristics, and a high-mode wave thereof. Each of these waves is a composite wave of vertical and horizontal waves. In general, they are different in acoustic velocity depending upon the thickness of the propagator and the frequency. The S0 wave is fastest in acoustic velocity, so that it is always the first to be received by the receivers. Since the wave S0 is less dispersive in the group velocity and phase velocity which otherwise occur owing to differences in the acoustic velocity, it is superior to the other waves in detecting a rising value of receptive waveforms in measuring the time of propagation.

The conventional ultrasonic coordinates input devices use signals such as driving pulses generated by an ultrasonic input pen, which are clear in rising, as a starter for measuring the time of propagation. In contrast, the present invention must use an ultrasonic receiving waveform at the start and termination of measuring time differences in a receiving time. This is likely to cause more errors than the prior art is. As a result, the present invention uses a wave S0 which is especially stable in detecting a rise.

Figure 10:
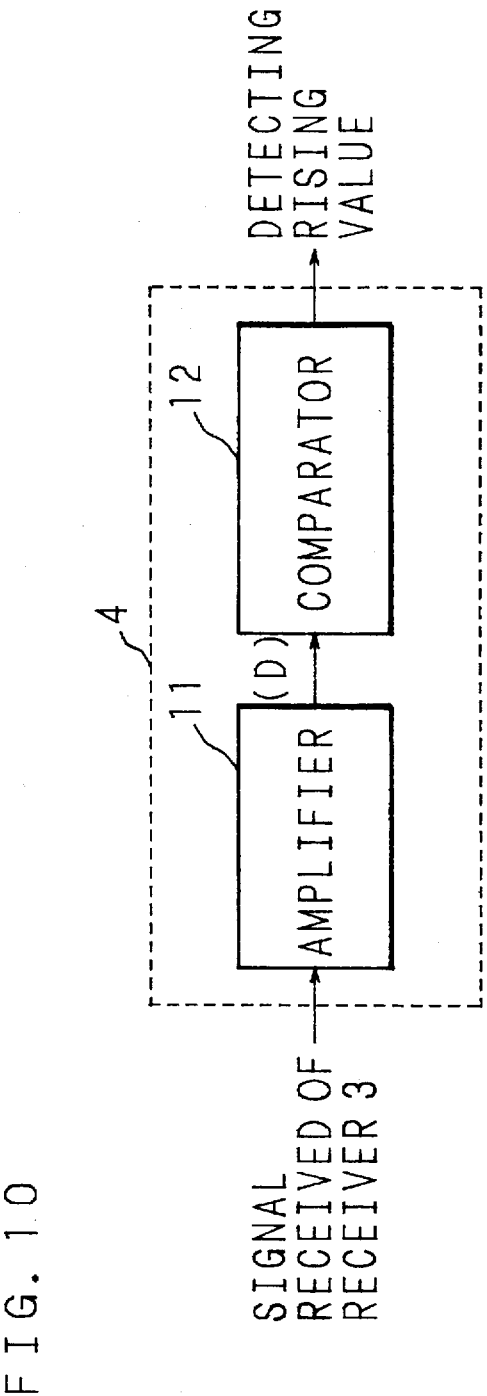
FIG. 10 is a circuit diagram showing a detector circuit used in the present invention.
Figure 11:
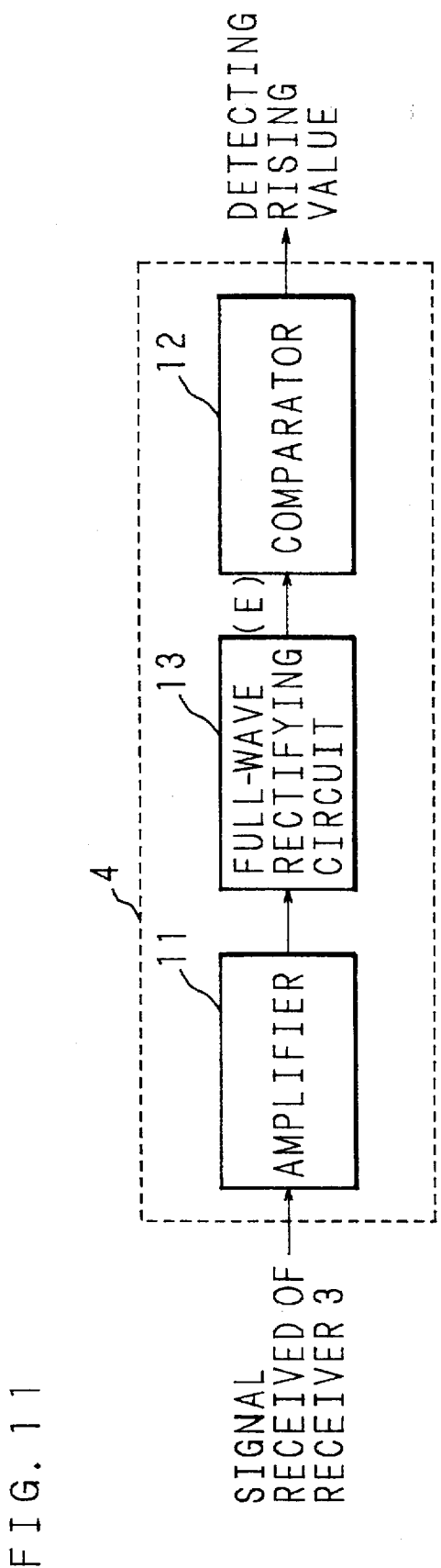
FIG. 11 is a circuit diagram showing another example of the detector circuit used in the present invention.
Figure 12:
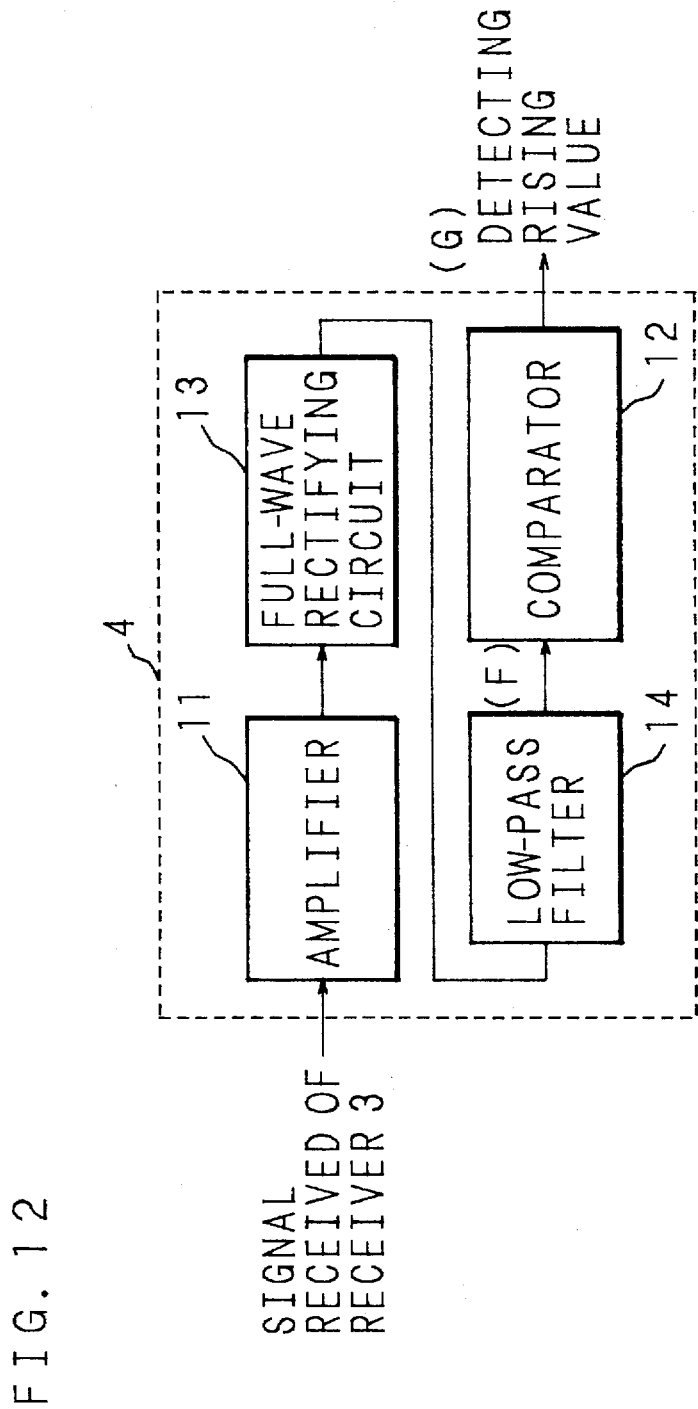
FIG. 12 is a circuit diagram showing a further example of the detector circuit used in the present invention.
Figure 13:
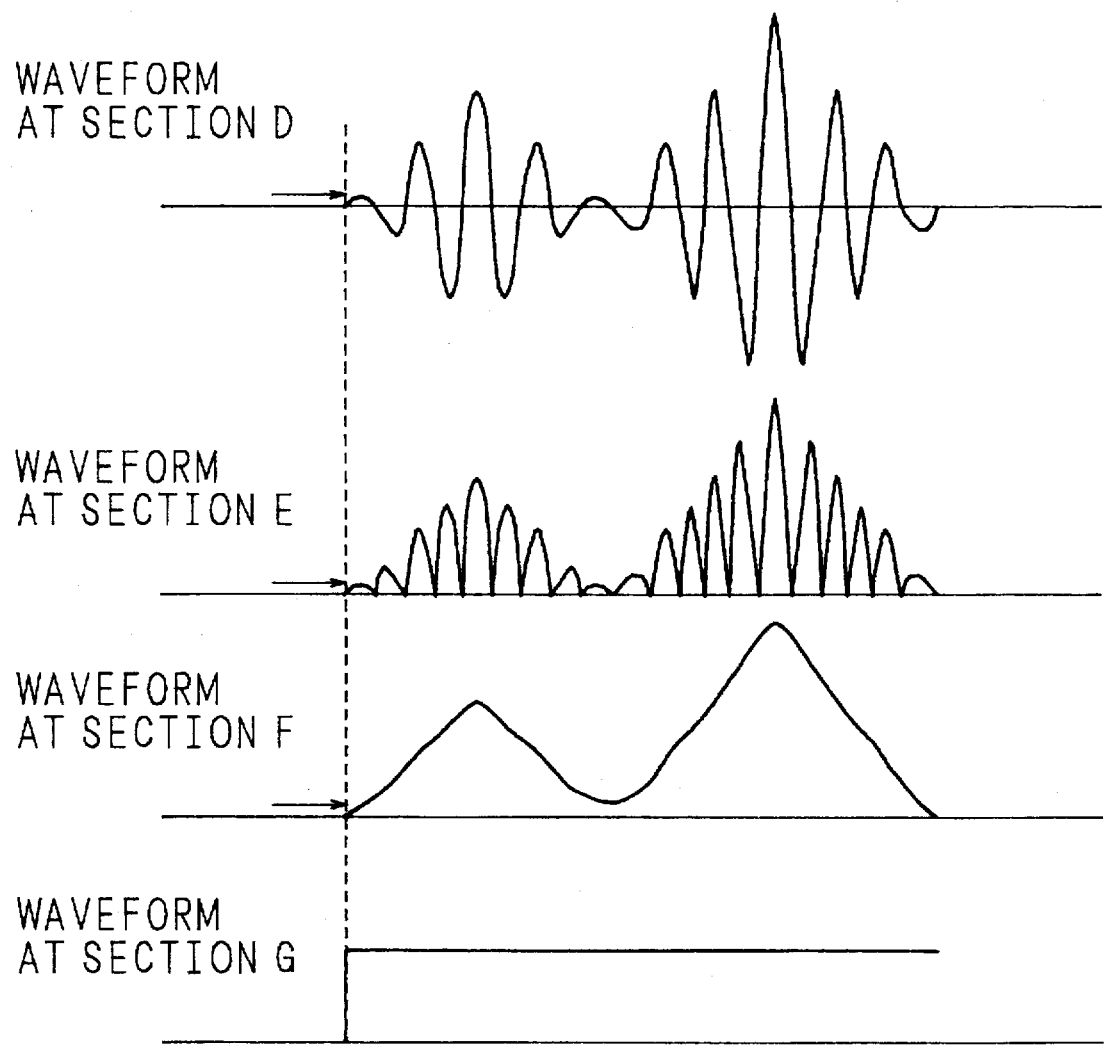
FIGS. 13 show waveforms in the respective sections in the detector circuits in FIGS. 10, 11 and 12.

Referring to FIGS. 10, 11 and 12 show the internal structure of the detector circuit 4 in each example, and FIG. 13 shows the waveform at each section D, E, F, G shown in FIGS. 3, 10, 11, 12.

FIG. 10 shows a first example of the detector circuit 4 for detecting a rise, which includes an amplifier 11 for amplifying a signal inputted to the detector circuit 4 and a comparator 12. The level of a first wave of the ultrasonic signal is inputted to the comparator 12 whereby it is compared with a threshold level. If it exceeds the threshold level, it is identified as a rise. However, if the level of the first wave is below the threshold level, the second or subsequent wave must be used to identify a rise. In this case, the measured time difference is likely to contain an error by one wavelength. It is also likely to contain an error by ½ wavelength depending upon whether the first wave starts with a rise or a fall.

FIG. 11 shows a second example of the detector circuit 4 for detecting a rise, which includes a full-wave rectifying circuit 13 in addition to the amplifier 11 and the comparator 12. The full-wave rectifying circuit 13 rectifies the ultrasonic signals inputted to the detector circuit 4. Likewise, the level of a first wave of the ultrasonic signal is inputted to the comparator 12 whereby it is compared with a threshold level. If it exceeds the threshold level, it is identified as a rise. In this second example, if the level of the first wave is below the threshold level and as described in the first example, the second or subsequent wave is used to identify a rise, the error unavoidably contained in the measured time difference can be reduced to ½ wavelength. This is an advantage over the first example.

FIG. 12 shows a third example of the detector circuit 4 for detecting a rise, which includes a low-pass filter 14 (alternatively, an orthogonal wave detector circuit) in addition to the full-wave rectifying circuit 13, the amplifier 11 and the comparator 12. The full-wave rectifying circuit 13 rectifies the ultrasonic signals inputted to the detector circuit 4, and an envelop component of the signal is detected by the low-pass filler 14. The level obtained in this way is compared with a threshold level by the comparator 12. If it exceeds the threshold level, it is identified as a rise. In this third example, if the level of the first wave is below the threshold level and as described in the first example, the second or subsequent wave is used to identify a rise, the error unavoidably contained in the measured time difference can be reduced to ½ wavelength.

In this way, the wave S0, which is fastest of all the ultrasonic signals propagating through the propagator 2 and is the first to be received by the receiver, is used to calculate coordinates by detecting the rise of the first wave thereof. Thus, the detection of the rise is kept from being influenced by reflected waves through the end of the propagator 2 which are detected subsequently to the detection of the rise. As a result, since there is no need for providing an ultrasonic wave absorber around the propagator 2 to absorb the reflected waves through the end of the propagator 2, the ultrasonic coordinates input device can be reduced to a handy and compact size.

Figure 14:
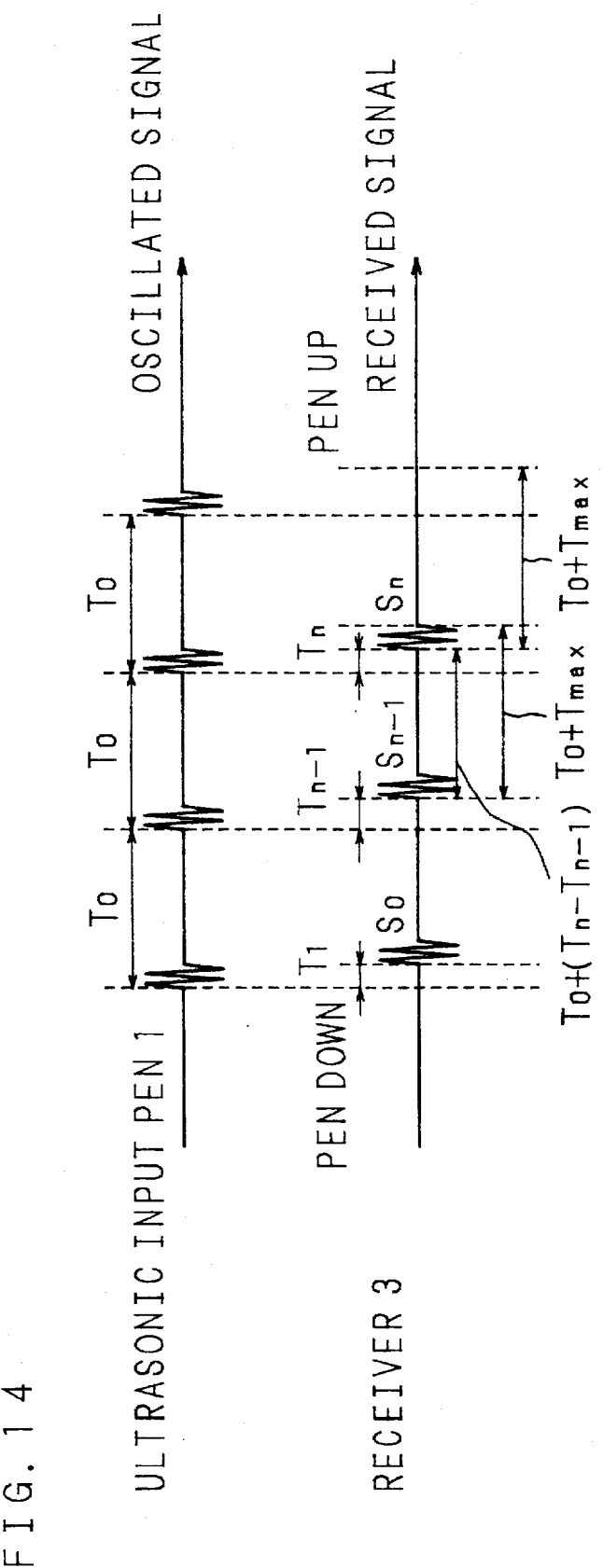
FIG. 14 is a view showing the waveforms exemplifying the up-down (in-touch/out-of-touch) detection of the input pen according to the present invention.

The manner of performing an up-down detection, that is, of ascertaining that the input pen 1 comes into touch or out of touch with the propagator 2 will be described:

FIG. 14 shows a first example of the up-down detection of the input pen 1. When the input pen 1 comes into touch with the propagator 2, the touch (down) is recognized by the receiver 3 receiving the ultrasonic signal. Subsequently, the input pen 1 oscillates ultrasonic pulses at a cycle $T_0$.

Take one of the receivers 3 as an example; an ultrasonic signal $S_n$ is received $T_0+(T_n-T_{n-1})$ later than a signal $S_{n-1}$ when a delayed time $T_n$ in propagating through the propagator 2 is taken into consideration. The time $(T_n-T_{n-1})$ takes a maximum value $T_{max}$ when the input pen 1 is at a farthest point on the propagator 2 from a nearest point to the receiver 3 within one cycle. If the receiver 3 receives the next signal within the time $(T_0+T_{max})$ after it receives an ultrasonic signal, it is recognized that the input pen 1 comes in touch with the propagator 2, and if the receiver 3 receives no next signal after the time $(T_0+T_{max})$ or more passes, it is recognized that the input pen 1 comes out of touch with the propagator 2.

The time ($T_0+T_{max}$) for the up-down detection of the input pen 1 can be measured by a special clock counter or by a counter which is used to measure time differences in receiving signals. Alternatively, the measuring can be performed by software. It may sometimes happen that a signal or signals of one or more ultrasonic waves fail to be received because the input pen 1 inadvertently comes out of touch with the propagator 2 owing to a flaw on the propagator 2 or a pressure exerting thereon. To prevent this problem, it is preferred that a redundancy is imparted to the up-down detection, thereby enhancing the workability. When a series of signals from waves 0 to N are not received, it is readily recognized that the input pen 1 comes out of touch with the propagator 2. Likewise, the time for effecting the up-down detection by the input pen 1 may be set to ($T_0+T_{max}$)×N or more.

Figure 15:
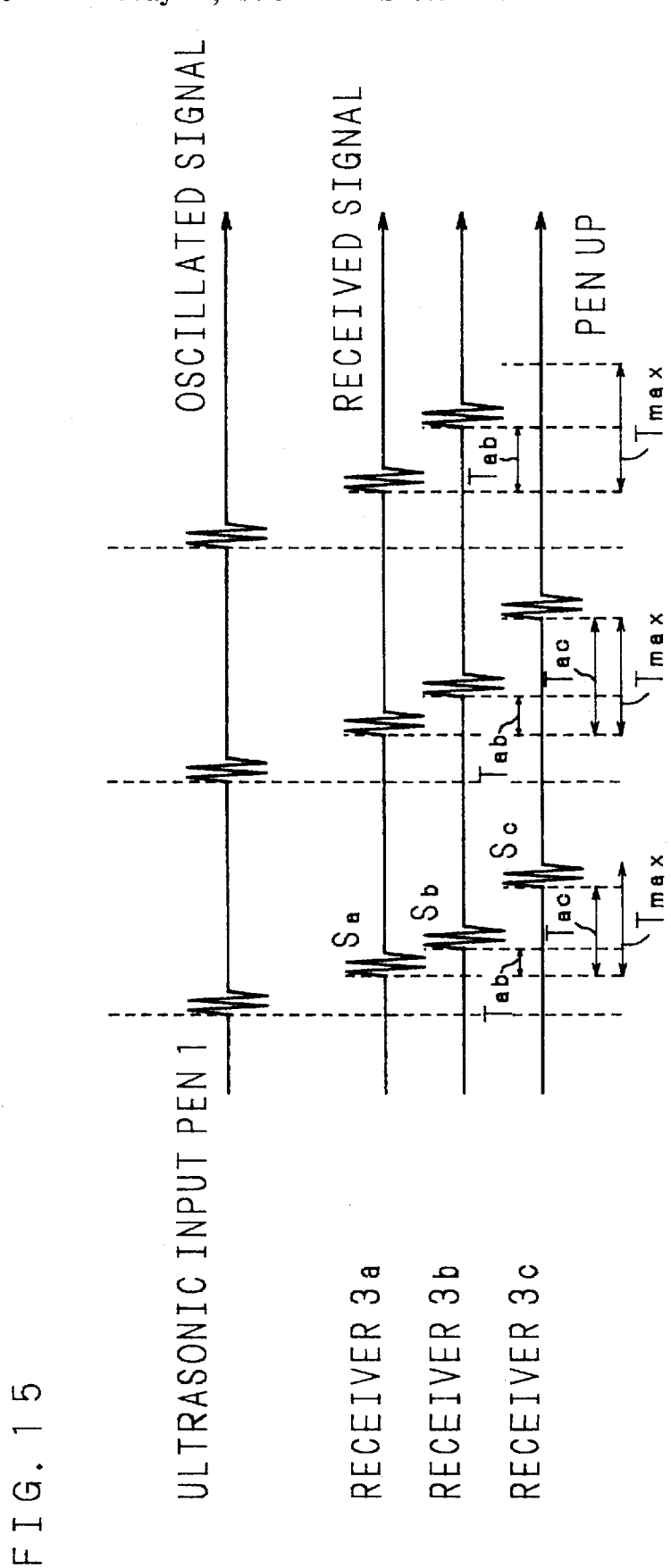
FIG. 15 is a view showing the waveforms exemplifying the up-down (in-touch/out-of-touch) detection of the input pen according to another example of the present invention.

FIG. 15 shows a second example of the up-down detection of the input pen 1. In this example, a plurality of receivers 3 are taken as an example. As described above, the coordinates are calculated by making use of the time differences of receiving the signals between one receiver and the other, and the time differences take a maximum value $T_{max}$ when the input pen 1 comes to a nearest point to the receiver. If after a first ultrasonic signal $S_a$ is received at the receiver 3a, the other receivers 3b and 3c receive signals $S_b$ and $S_c$ within the time $T_{max}$, it is recognized that the input pen 1 is in touch with the propagator 2 and that the inputting of coordinates are in a normal condition. On the contrary, if the other receivers 3b and 3c do not receive either the signals $S_b$ or $S_c$ within the time $T_{max}$ or more, it is recognized that the input pen 1 is out of touch with the propagator 2. The time for which the out-of-touch continues can be measured through the overflow of a clock counter.

Figure 16:
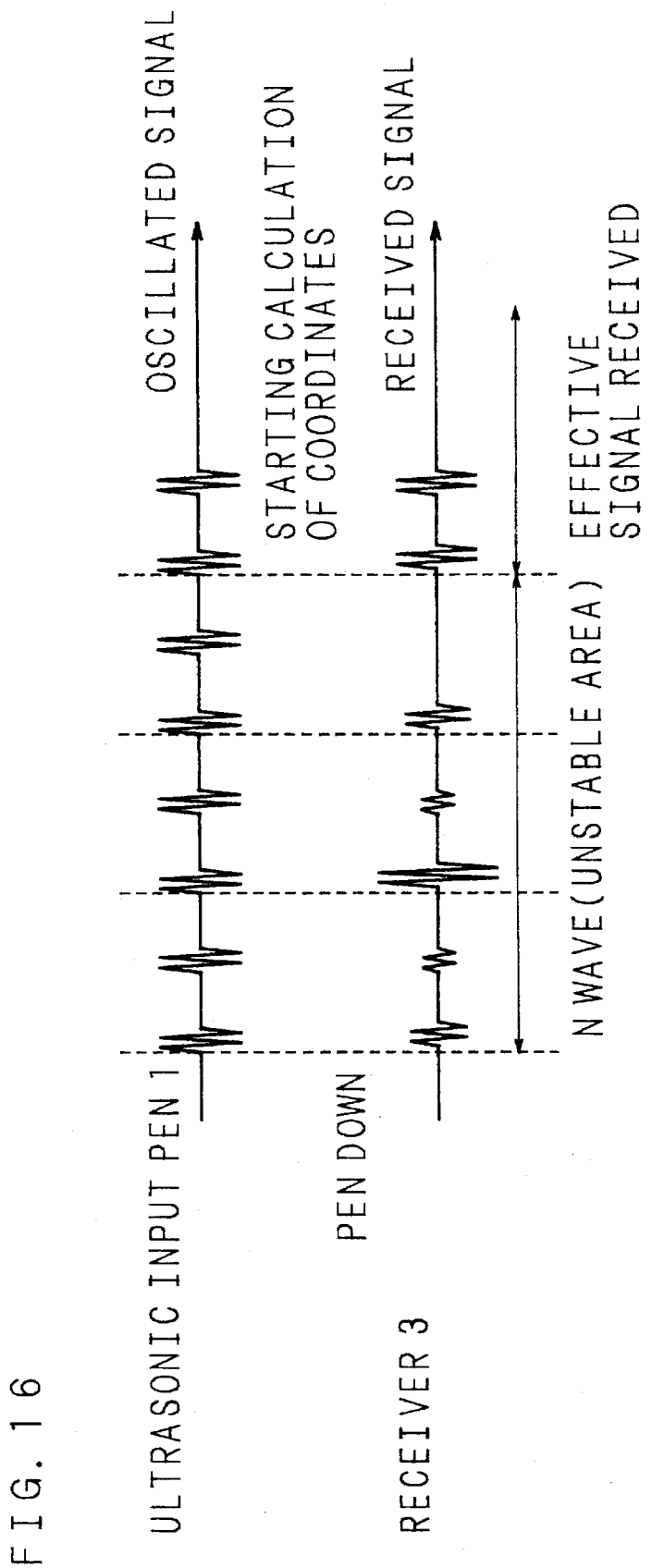
FIG. 16 is a view showing the waveforms exemplifying the cancellation of unstable ultrasonic wave signals in the present invention.

As shown in FIG. 16, it takes a time represented in terms of a few waves until the waveforms and level of ultrasonic waves are stabilized by keeping the input pen 1 in touch with the propagator 2. Until then, the accuracy of calculating the coordinates is extremely reduced. Therefore, immediately after the input pen 1 comes into touch with the propagator 2, signals 1 to N received are ignored and neither calculation of coordinates nor up-and-down detection of the input pen 1 is conducted. After the (N+1)th signals and the subsequent signals are received, the calculation of coordinates and up-and-down detection of the input pen 1 are conducted. In this way the initial inaccurate calculation of coordinates can be avoided.

In order to ignore the unstable signals received immediately after the input pen 1 comes into touch with the propagator 2, it is preferable to avoid outputting pulses within the unstable period of time or to avoid measuring time differences in receiving signals.

The amplification factor within the detector circuit 4 in the present invention is adjusted as follows:

In general, in the ultrasonic coordinates input device it may happen that the levels of the ultrasonic signal differ depending upon the pressure and/or a manner of holding the input pen 1. While the input pen runs on the propagator for drawing a locus, the level of signal varies in a relatively large range in accordance with variations in the pressing force or the state of touching. This is likely to unfavorably affect the accuracy of calculation of coordinates. It is essential to maintain the level of the ultrasonic signals as constant as possible.

Figure 17:
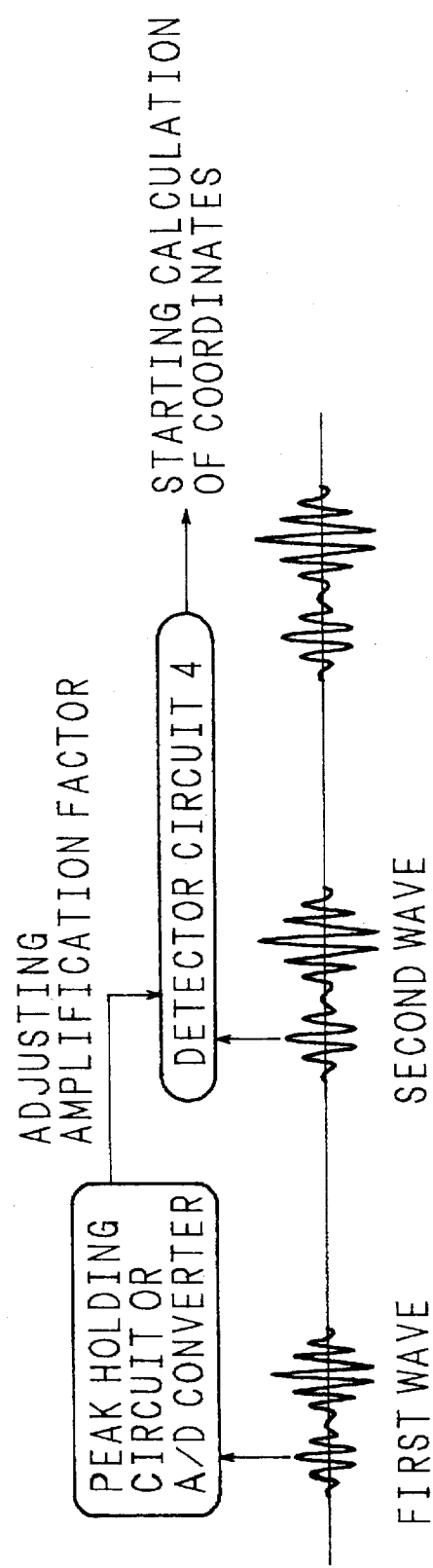
FIG. 17 is a view exemplifying the automatic adjustment of amplification factors according to the present invention.

FIG. 17 shows a first example of equalizing the levels of ultrasonic signals. The first wave of the effective signal received is ignored and not used to calculate the coordinates. The level of the first wave is measured by a peak holding circuit or an A/D converter, and in accordance with the measured level the amplification factor of the amplifier 11 within the detector circuit 4 (refer to FIGS. 10, 11 and 12) is adjusted. Thereafter, the received signals are amplified in accordance with the adjusted amplification factor so as to calculate the coordinates. In this way variations in the level of received signals characteristic of individual operators can be adjusted.

Figure 18:
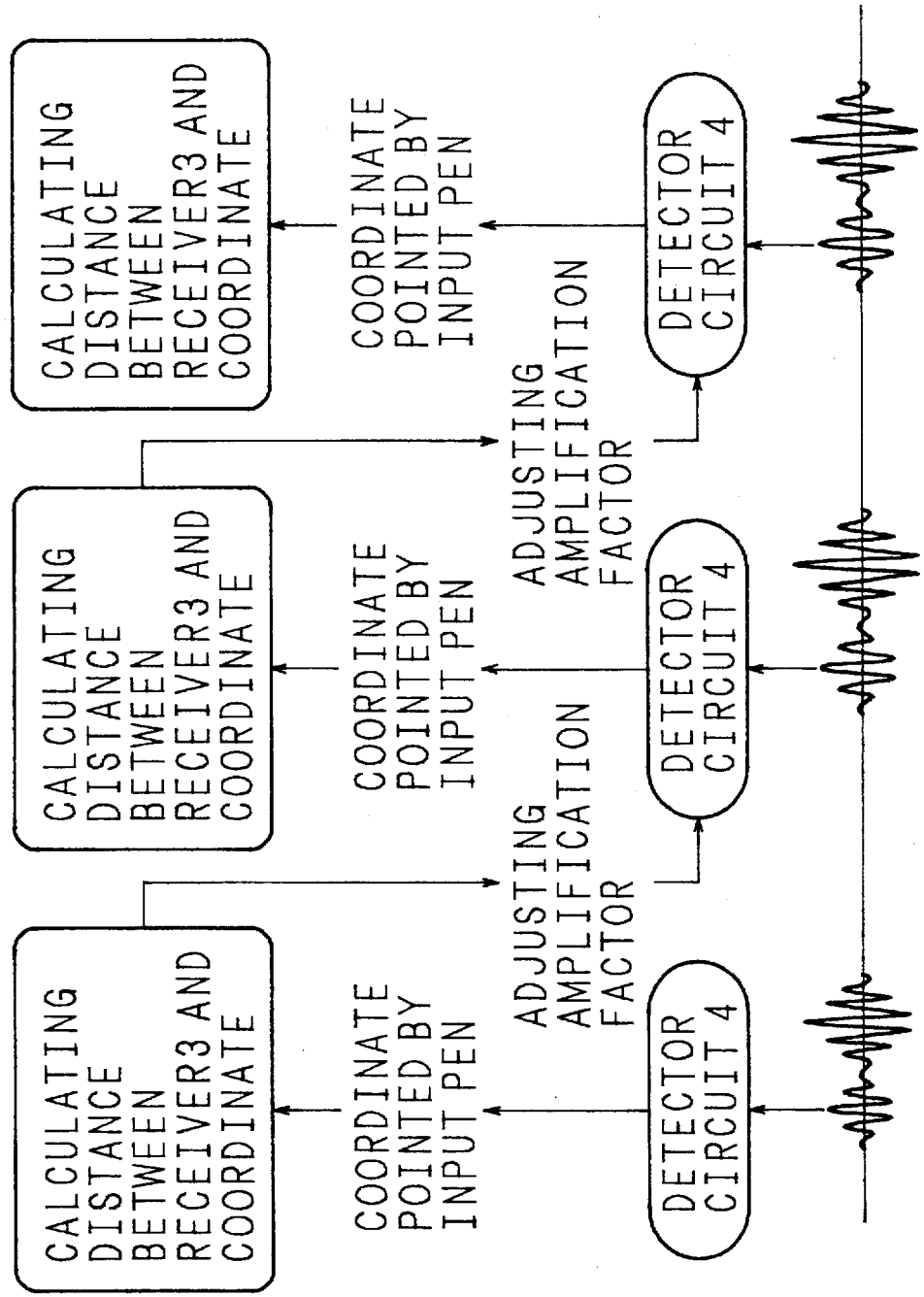
FIG. 18 is a view exemplifying the automatic adjustment of amplification factors according to another example of the present invention.

FIG. 18 shows a second example of equalizing the level of ultrasonic signals. First, time differences among the receivers 3 are used to measure the coordinates pointed by the input pen 1, and then the coordinates value is used to calculate the distance between each of the receivers 3 and (he coordinates by using an inverse operation. In accordance with the measured distance, the amplification of the amplifier 11 within the detector circuit 4 is adjusted. Since the level of the received signal lowers as the distance between the receiver 3 and the coordinates becomes large, the amplification of the amplifier 11 within the detector circuit 4 far from the coordinates is increased so as to equalize the level of the received signals. In this way inadvertent irregularity in the levels of the received signals due to variations in the pressure or the touching conditions when drawing a locus are remedied, thereby enhancing the accuracy of the detection of coordinates.

Figure 19:
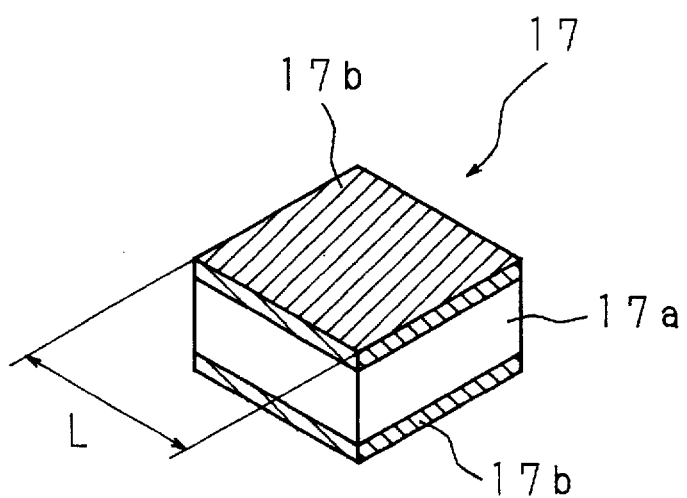
FIG. 19 is a perspective cross-sectional view showing a piezoelectric oscillator used as an ultrasonic receiver in the present invention.
Figure 20:
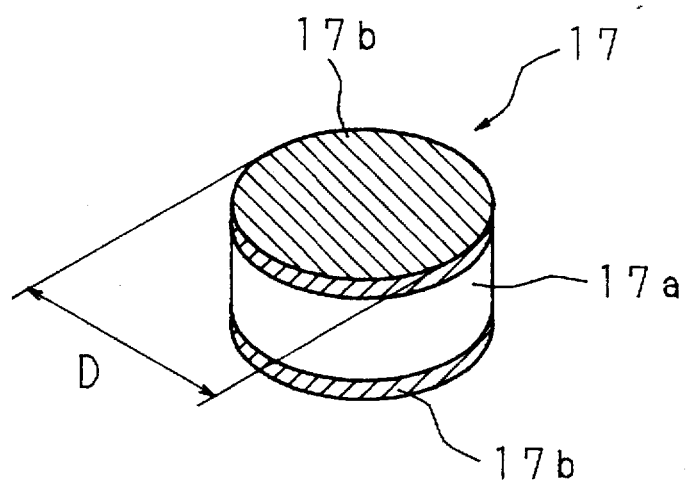
FIG. 20 is a perspective cross-sectional view showing another example of the piezoelectric oscillator used as an ultrasonic receiver in the present invention.
Figure 21:
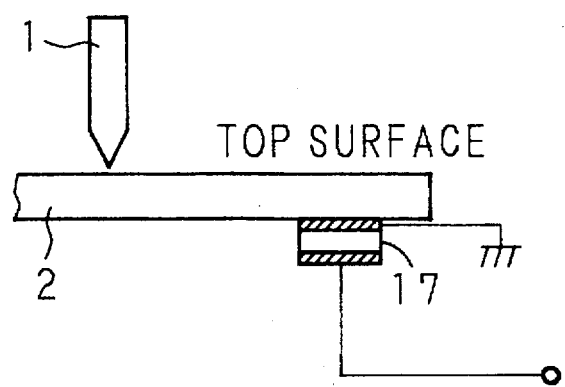
FIG. 21 is a view showing the positional relationship between the piezoelectric oscillator (receiver) and the propagator according to the present invention.

When a piezoelectric oscillator is used as an ultrasonic receiver, a piezoelectric receiver 17 which, as shown in FIGS. 19 and 20, includes a piezoelectric member 17a as of PZT-base piezoelectric ceramics sandwiched between electrodes 17b, 17b. The piezoelectric oscillator 17 can be a type either of a square pole (FIG. 19) or of a short cylinder (FIG. 20). The square pole type is advantageous in that many sizes can be easily obtainable as desired from a large oscillatory plate, thereby reducing the production cost. The short cylinder type is advantageous in that the receptive sensitivity is non-directive, thereby providing an effective receiver of ultrasonic signals.

Suppose that the square pole has a length L of the base, and the cylinder type has a diameter D. The length L and the diameter D are determined by considering the adhesive used to bond the oscillator to the propagator, and the properties of a material of which the propagator 2 is made. By selecting a wavelength of half (½) that of an ultrasonic wave propagating through the piezoelectric oscillator or a wavelength of half (½) that of an ultrasonic wave propagating through the propagator, the sensitivity of reception can be enhanced. It is preferred that the height or thickness of the oscillator is acoustically (in terms of frequency) negligible as compared with the length L or the diameter D.

In the example described above, as shown in FIG. 21, if all the receivers (piezoelectric oscillators 17) are provided on the bottom surface of the top surface of the propagator 2 to which an ultrasonic wave is inputted, the top surface is advantageously flat with no projection, thereby providing a low or thin casing because of the free space in the ultrasonic wave input side.

Figure 22:
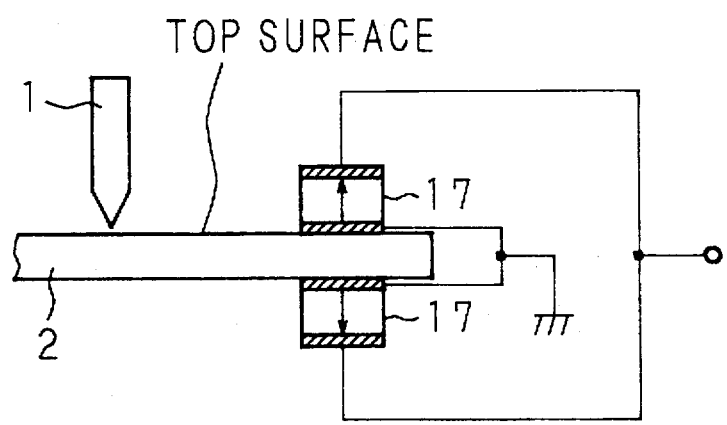
FIG. 22 is a view showing the positional relationship between the piezoelectric oscillator (receiver) and the propagator according to another example of the present invention.
Figure 23:
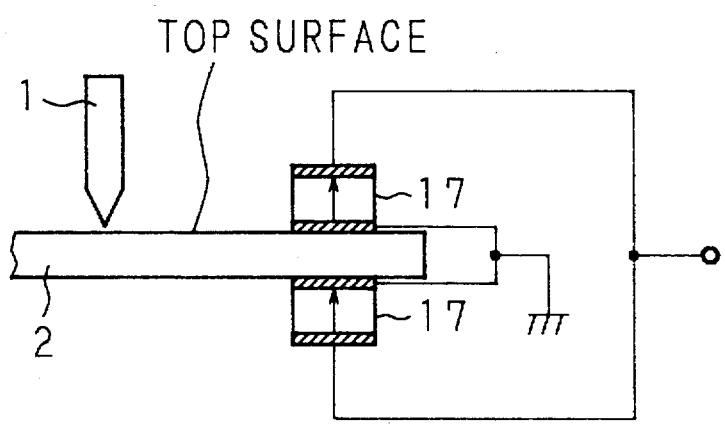
FIG. 23 is a view showing the positional relationship between the piezoelectric oscillator (receiver) and the propagator according to a further example of the present invention.

As shown in FIG. 22, the piezoelectric oscillator 17 is polarized as indicated by the arrows, with one on the top surface and the other on the bottom surface of the propagator 2 so as to avoid the influence of a high-level wave A, thereby receiving a faster wave S positively. If the influence of the wave S is to be avoided, and the wave A is to be positively received, the piezoelectric oscillator 17 is polarized as indicated by the arrows as shown in FIG. 23, wherein unlike the example of FIG. 22 the arrows are in the same direction, with one on the top surface and the other on the bottom surface of the propagator 2.

Figure 24:
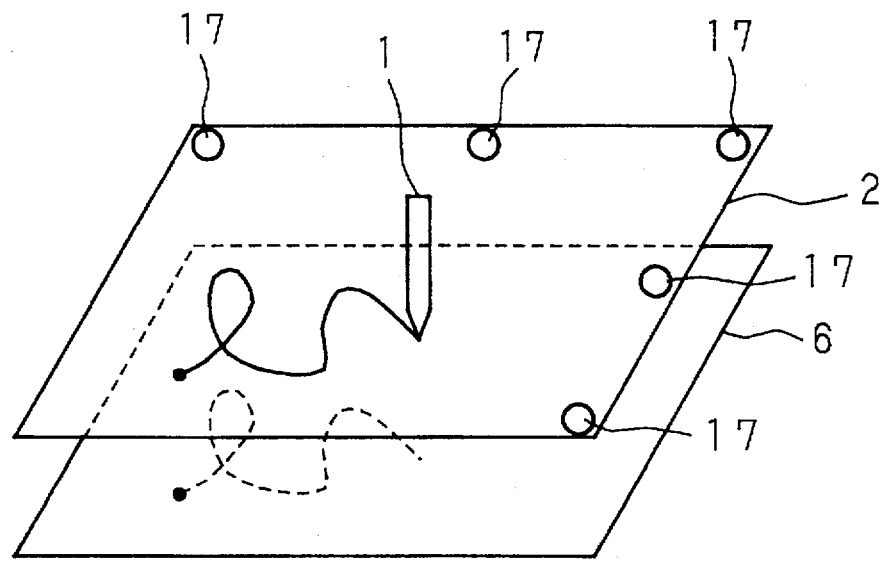
FIG. 24 is a view showing the positional relationship between the propagator and the display panel according to the present invention.

FIG. 24 shows a further example of the input device formed as a tablet to show data on the detected coordinates on another display, wherein the propagator 2 is made of a transparent material such as glass, epoxy resin, or acrylic resin. By placing this kind of propagator 2 on the display panel 6, the input device of the present invention will find more applications such as wordprocessors and CADs.

The ultrasonic input pen system according to the present invention can be readily fabricated by making the propagator 2 of soda glass in common use, and arranging several receivers at appropriate positions on the propagator 2. Unlike the electromagnetic induction system and the resistance film system, the input pen system of the invention eliminates the process of fabricating special electrodes. As a result, even if the display panel is large, the same structure can be used without the size being changed. When a large display panel is to be used, there is a worry about a reduction in the yields because of the process of making special electrodes but there is no such worry with the present invention.

Some degree of flexibility is inherent in the propagator 2 but it is not seriously influential upon the characteristics of propagation; it does not matter whether the surface of the display panel is a plasma display panel or a liquid crystal panel or a cathode ray tube having a non-flat surface.

As described above, the present invention calculates coordinates on the basis of the results of signals received from each group of signal receivers wherein the waveforms of signals in each group have no substantial phase differences, thereby reducing the possibility of calculation errors which otherwise would be involved in the phase differences.

There is no need for using complicated arithmetic formulae to obtain coordinates, thereby avoiding overload upon the arithmetic circuits. This reduces the production cost and can provide inexpensive products.

Coordinates are calculated on the basis of time differences in receiving ultrasonic waves between one receiver and other, thereby eliminating the necessity of using a cord connecting the input pen with the body of the device. A cordless structure is superior in operability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An ultrasonic coordinates input device comprising:
   a propagator for allowing ultrasonic wave to propagate therethrough;
   input means for inputting ultrasonic waves to the propagator;
   a plurality of groups of receivers each receiving the ultrasonic waves propagated through the propagator; and
   arithmetic means for calculating the coordinates of the ultrasonic wave inputted positions on the propagator on the basis of the signals received at the receivers in the respective groups;
   wherein each group of receivers includes at least three receivers which are substantially aligned.

2. An ultrasonic coordinates input device comprising:
   a propagator for allowing ultrasonic wave to propagate therethrough;
   input means for inputting ultrasonic waves to the propagator;
   a plurality of groups of receivers each receiving the ultrasonic waves propagated through the propagator; and
   arithmetic means for calculating the coordinates of the ultrasonic wave inputted positions on the propagator on the basis of the signals received at the receivers in the respective groups;
   wherein the receivers are grouped into two groups, and the arithmetic means calculates the coordinates on one of the orthogonal coordinates axes on the basis of signals received by the receivers in one group, and calculates the coordinates on the other axis on the basis of signals received by the receivers in the other group.

3. The input device according to claim 2, wherein the arithmetic means calculates, a part of the coordinates of the ultrasonic wave inputted positions to be calculated on the basis of the signals received at the receivers in the respective groups.

4. The input device according to claim 3, wherein each of the receivers receives a rise of a first wave of a planar symmetrical wave which is fastest of the ultrasonic waves propagating through the propagator.

5. An ultrasonic coordinates input device comprising:
   a propagator for allowing ultrasonic wave to propagate therethrough;
   input means for inputting ultrasonic waves to the propagator;
   a plurality of groups of receivers each receiving the ultrasonic waves propagated through the propagator; and
   arithmetic means for calculating the coordinates of the ultrasonic wave inputted positions on the propagator on the basis of the signals received at the receivers in the respective groups;
   wherein each of the receivers receives a planar symmetrical wave which is fastest of the ultrasonic waves propagating through the propagator, and is additionally provided with a detecting means for effecting the full-wave rectification of the planar symmetrical waves so as to detect a rise of the first wave or an envelop component thereof, wherein the arithmetic means measures time differences in receiving the ultrasonic waves between the receivers in accordance with the results of detection obtained by the detecting means.

6. An ultrasonic coordinates input device comprising:
   a propagator for allowing ultrasonic wave to propagate therethrough;
   input means for inputting ultrasonic waves to the propagator;
   a plurality of groups of receivers each receiving the ultrasonic waves propagated through the propagator;
   arithmetic means for calculating the coordinates of the ultrasonic wave inputted positions on the propagator on the basis of the signals received at the receivers in the respective groups; and
   identifying means for identifying a shift of the ultrasonic wave input means in response to the reception of ultrasonic waves within a predetermined period of time, wherein the predetermined period of time is not shorter than the greatest of all the time differences between the receivers.

7. An ultrasonic coordinates input device comprising:
   a propagator for allowing ultrasonic wave to propagate therethrough;

input means for inputting ultrasonic waves to the propagator;

a plurality of groups of receivers each receiving the ultrasonic waves propagated through the propagator;

arithmetic means for calculating the coordinates of the ultrasonic wave inputted positions on the propagator on the basis of the signals received at the receivers in the respective groups; and identifying means for identifying a shift of the input means in response to the reception of ultrasonic waves within a predetermined period of time, wherein the predetermined period of time is not shorter than the greatest of all the time differences between the receivers, and the identifying means ignores a predetermined number of signals received immediately after the receivers start to receive and identifies the shift of the input means on the basis of the signals subsequently received.

8. An ultrasonic coordinates input device comprising:

a propagator for allowing ultrasonic wave to propagate therethrough;

input means for inputting ultrasonic waves to the propagator;

a plurality of groups of receivers each receiving the ultrasonic waves propagated through the propagator; and arithmetic means for calculating the coordinates of the ultrasonic wave inputted positions on the propagator on the basis of the signals received at the receivers in the respective groups;

wherein the arithmetic means ignores a predetermined number of signals received immediately after the receivers start to receive and calculates the coordinates of the ultrasonic wave inputted positions on the basis of the signals subsequently received.

9. An ultrasonic coordinates input device comprising:

a propagator for allowing ultrasonic wave to propagate therethrough;

input means for inputting ultrasonic waves to the propagator;

a plurality of groups of receivers each receiving the ultrasonic waves propagated through the propagator;

arithmetic means for calculating the coordinates of the ultrasonic wave inputted positions on the propagator on the basis of the signals received at the receivers in the respective groups;

an amplifier for amplifying signals received by each of the receivers; and means for adjusting the amplification factor of the amplifier in accordance with the amplitudes of the signals received by each receiver.

10. An ultrasonic coordinates input device comprising:

a propagator for allowing ultrasonic wave to propagate therethrough;

input means for inputting ultrasonic waves to the propagator;

a plurality of groups of receivers each receiving the ultrasonic waves propagated through the propagator;

arithmetic means for calculating the coordinates of the ultrasonic wave inputted positions on the propagator on the basis of the signals received at the receivers in the respective groups;

an amplifier for amplifying signals received by each of the receivers; and means for adjusting the amplification factor of the amplifier in accordance with the distances between the respective receivers and the ultrasonic wave inputted positions calculated on the basis of the coordinates already obtained.

11. The input device according to claim 2, wherein the input means comprises an oscillator for oscillating ultrasonic waves so as to constitute a cordless ultrasonic coordinates input device.

12. The input device according to claim 1, wherein the arithmetic means calculates a part of the coordinates of the ultrasonic wave inputted positions to be calculated on the basis of the signals received at the receivers in the respective groups.

13. The input device according to claim 1, wherein the receivers are grouped into two groups, and the arithmetic means calculates the coordinates on one of the orthogonal coordinates axes on the basis of signals received by the receivers in one group, and calculates the coordinates on the other axis on the basis of signals received by the receivers in the other group.

14. The input device according to claim 1, wherein each of the receivers receives a rise of a first wave of a planar symmetrical wave which is fastest of the ultrasonic waves propagating through the propagator.

15. The input device according to claim 1, wherein each of the receivers receives a planar symmetrical wave which is fastest of the ultrasonic waves propagating through the propagator, and is additionally provided with a detecting means for effecting the full-wave rectification of the planar symmetrical wave so as to detect a rise of the first wave or an envelop component thereof, wherein the arithmetic means measures time differences in receiving the ultrasonic waves between the receivers in accordance with the results of detection obtained by the detecting means.

16. The input device according to claim 1, further comprising an identifying means for identifying a shift of the ultrasonic wave input means in response to the reception of ultrasonic waves within a predetermined period of time, wherein the predetermined period of time is not shorter than the greatest of all the time differences between the receivers.

17. The input device according to claim 1, further comprising an identifying means for identifying a shift of the input means in response to the reception of ultrasonic waves within a predetermined period of time, wherein the predetermined period of time is not shorter than the greatest of all the time differences between the receivers, and the identifying means ignores a predetermined number of signals received immediately after the receivers start to receive and identifies the shift of the input means on the basis of the signals subsequently received.

18. The input device according to claim 1, wherein the arithmetic means ignores a predetermined number of signals received immediately after the receivers start to receive, and calculates the coordinates of the ultrasonic wave inputted positions on the basis of the signals subsequently received.

19. The input device according to claim 1, further comprising an amplifier for amplifying signals received by each of the receivers; and means for adjusting the amplification factor of the amplifier in accordance with the amplitudes of the signals received by each receiver.

20. The input device according to claim 1, further comprising an amplifier for amplifying signals received by each of the receivers; and means for adjusting the amplification factor of the amplifier in accordance with the distances between the respective receivers and the ultrasonic wave inputted positions calculated on the basis of the coordinates already obtained.

21. The input device according to claim 1, wherein the input means comprises an oscillator for oscillating ultrasonic waves so as to constitute a cordless ultrasonic coordinates input device.

22. The input device according to claim 6, wherein the period of time is an integral multiplication of the greatest time difference.

23. The input device according to claim 7, wherein the period of time is an integral multiplication of the greatest time difference.

24. The input device according to claim 16, wherein the period of time is an integral multiplication of the greatest time difference.

25. The input device according to claim 17, wherein the period of time is an integral multiplication of the greatest time difference.

* * * * *